United States Patent
Breeding et al.

(10) Patent No.: US 6,299,534 B1
(45) Date of Patent: *Oct. 9, 2001

(54) GAMING APPARATUS WITH PROXIMITY SWITCH

(75) Inventors: John G. Breeding; James P. Helgesen, both of Eden Prairie, MN (US)

(73) Assignee: Shuffle Master, Inc., Eden Prairie, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,473

(22) Filed: Dec. 26, 1997

Related U.S. Application Data (63) Continuation of application No. 08/567,001, filed on Dec. 4, 1995, now abandoned, and a continuation-in-part of application No. 08/388,292, filed on Feb. 14, 1995, which is a continuation-in-part of application No. 08/043,413, filed on Apr. 6, 1993, which is a continuation-in-part of application No. 08/023,196, filed on Feb. 25, 1993, now Pat. No. 5,288,081, said application No. 08/567,001, is a continuation-in-part of application No. 08/041,850, filed on Apr. 2, 1993.

(51) Int. Cl.⁷ ........................................... A63F 1/06
(52) U.S. Cl. ................. 463/25; 463/13; 463/42; 273/292; 273/309; 273/274
(58) Field of Search ................... 273/309, 274, 273/292; 463/13, 25, 42, 12

(56) References Cited

U.S. PATENT DOCUMENTS

| | | |
|---|---|---|
| 3,939,953 | 2/1976 | Miyazawa . |
| 4,396,193 | 8/1983 | Reinhardt et al. . |
| 4,483,431 | 11/1984 | Pratt . |
| 4,593,904 | 6/1986 | Graves . |
| 4,652,988 | 3/1987 | Zoza et al. . |
| 4,659,087 | 4/1987 | Shen et al. . |
| 4,813,675 | 3/1989 | Greenwood . |
| 4,837,728 | 6/1989 | Barrie et al. . |
| 4,842,276 | 6/1989 | Durby . |
| 4,861,041 | 8/1989 | Jones et al. . |
| 4,882,473 | 11/1989 | Bergeron et al. . |
| 4,906,005 | 3/1990 | Manabe . |
| 4,948,134 | 8/1990 | Suttle et al. . |
| 5,042,635 | 8/1991 | Bell . |

(List continued on next page.)

FOREIGN PATENT DOCUMENTS

| | | |
|---|---|---|
| 2195325 | 10/1995 | (CA) . |
| 4439502 | 11/1994 | (DE) . |
| 0443420 | 8/1991 | (EP) . |

OTHER PUBLICATIONS

U.S. Copyright Registration No. Txu 538 276 dated Dec. 16, 1998, 7 pages.
Aruba Copyright Registration No. AUT—880113.11 dated Jan. 13, 1988, 14 pages.

Primary Examiner—Benjamin H. Layno
(74) Attorney, Agent, or Firm—Mark A. Litman: Assoc. PA.; Mark A. Litman (57) ABSTRACT

The present invention is for an apparatus for detecting the presence of a gaming token. This apparatus comprises a gaming structure having at least one predetermined location for receiving a gaming token. In a casino, this gaming structure can be a gaming table. At each predetermined location for receiving a gaming token designated on the gaming table, a proximity sensor is mounted to the gaming table such that each sensor is aligned with one predetermined location. A decoder is electrically connected to each proximity sensor for determining whether a gaming token is present at each predetermined location. When the presence of a gaming token is sensed by the decoder, the player's bet is registered.

22 Claims, 7 Drawing Sheets

U.S. PATENT DOCUMENTS

| | | |
|---|---|---|
| 5,098,107 | 3/1992 | Boylan et al. . |
| 5,112,060 | 5/1992 | Jones . |
| 5,114,155 | 5/1992 | Tillery et al. . |
| 5,116,055 | 5/1992 | Tracy . |
| 5,248,142 | 9/1993 | Breeding . |
| 5,275,415 | 1/1994 | Wisted . |
| 5,288,081 * | 2/1994 | Breeding ............................ 273/292 |
| 5,377,994 | 1/1995 | Jones . |
| 5,393,067 * | 2/1995 | Paulsen et al. ...................... 273/292 |
| 5,472,194 | 12/1995 | Breeding et al. . |
| 5,604,334 | 2/1997 | Luchinger et al. . |
| 5,626,341 | 5/1997 | Jones et al. . |
| 5,735,525 | 4/1998 | McCrea, Jr. . |
| 5,735,742 * | 4/1998 | French .................................. 463/25 |
| 5,743,798 | 4/1998 | Adams et al. . |

\* cited by examiner

GAMING APPARATUS WITH PROXIMITY SWITCH

This is a continuation of application Ser. No. 08/567,001, filed Dec. 4, 1995 now abandoned, which is a continuation-in-part of the following co-pending applications: (1) Ser. No. 08/041,850 filed Apr. 2, 1993; and (2) Ser. No. 08/388,292 filed Feb. 14, 1995, which is a continuation-in-part of application Ser. No. 08/043,413, filed Apr. 6, 1993, which is a continuation-in-part of application Ser. No. 08/023,196, filed Feb. 25, 1993, now U.S. Pat. No. 5,288,081.

TECHNICAL FIELD

The present invention generally relates to cardroom or video gaming involving multi-tiered wagering. More particularly, it relates to a gaming apparatus with a sensing device which includes a proximity sensor for sensing the wagering or placement of a gaming token, thereby determining and automatically registering player wagers in the multi-tiered game.

BACKGROUND OF THE INVENTION

Cardroom and video gaming involve many games, including multi-tiered wagering games. Such games provide a player with the opportunity to place a side bet on an additional game played in conjunction with a basic or underlying game. These cardroom games and video games may be located at a plurality of remote locations and be connected to each other to provide a large number of players an opportunity to play for a large common cash prize.

Prior art apparatus for automatically sensing the presence of gaming tokens used in cardroom and video gaming has several problems: (1) the indication of false positives; (2) a lack of provision for conveniently verifying that the bets have been properly registered by a computer to which the sensing apparatus is attached; and (3) the elimination of chips from circulation.

First, registering an unplaced bet costs the proprietor of the cardroom or video gaming facility money. Currently, in the cardroom and video gaming industry, some apparatus uses light sensors to detect the presence of a gaming token. When light sensors are used to detect the presence of a gaming token, the apparatus often falsely registers an unplaced bet as a placed bet because lint from the felt on the gaming table is sensed by the light sensors creating a false positive. Also, ambient light from the light sources in the facility may influence the light sensor and cause a false negative or lack of registration due to a marginal signal. Thus, an apparatus which will eliminate both false positive registrations and false negative registration failures would be very helpful in the cardroom and video gaming industry.

Second, cardroom and video gaming facilities need to verify that all wagers are properly registered by the computer. In order to have a secondary verification, a camera has been traditionally used. However, current apparatus does not provide a camera with a visual indication of whether the bet was registered. Consequently, an apparatus which allows a casino or proprietor of a cardroom and video gaming facility to be able to visually verify the registration of a properly placed bet is highly desirable.

Third, some current apparatus has a slot with a light sensor to detect the presence of a gaming token as it passes through the slot. In addition to the problems associated with the use of a light sensor described above, such apparatus takes the gaming token out of circulation. The gaming token disappears in the slot and is collected and accumulates beneath the table. This accumulation of tokens causes inefficiencies in the operation of a gaming facility because the apparatus prevents the gaming facility from immediately recirculating the gaming tokens after each bet. An apparatus that keeps gaming tokens in circulation is desirable.

SUMMARY OF THE INVENTION

The present invention is for an apparatus for detecting and registering the presence of a gaming token in a predetermined location or zone. The apparatus comprises a gaming structure such as a table having at least one predetermined location or zone for receiving a gaming token per player. At each such predetermined location or zone, a proximity sensor is mounted beneath the gaming table such that each sensor is aligned or in registration with and in sensing proximity to each predetermined location. Wagers are placed by a player placing a gaming token at the predetermined location or zone for the player. A decoder is electrically connected to each proximity sensor for determining whether a gaming token has been detected or sensed at each predetermined location. When the presence of a gaming token is sensed by the decoder, the player's bet is registered.

The present invention has a set of lighting devices which surround each predetermined location or zone. These lighting devices are turned on when the sensor detects the presence of a gaming token and registers each player's wager to (1) provide the dealer visual confirmation that the bet was registered; and (2) allow security cameras monitoring the gaming table to record the visual indication for additional recordation and verification.

One object of the present invention is to provide an apparatus which can reliably detect the presence of a gaming token placed in a predetermined location or zone.

Another object of the present invention is to provide an apparatus that can be easily maintained.

A further object of the present invention is to provide an apparatus that provides for conveniently verifying that the bets have been registered by a computer to which the sensing apparatus is attached for each gaming token that has been placed or wagered.

Another object of the present invention is to provide an apparatus with the above automatic detection and registration features that does not take gaming tokens out of circulation.

DETAILED DESCRIPTION

For this description of the preferred embodiment, the gaming token sensing apparatus of the present invention will be described in the context of the multi-tiered gaming apparatus used in conjunction with a table card game known as "LET IT RIDE®," as disclosed in U.S. patent application Ser. No. 08/023,196, filed Feb. 21, 1993, U.S. Pat. No. 5,288,081, assigned to the assignee of the present invention and incorporated by reference herein. However, the gaming token sensing apparatus and the multi-tiered gaming apparatus disclosed herein can be used with other games, and the present invention is not limited to use with the game disclosed in this description of the preferred embodiment.

Figure 1:
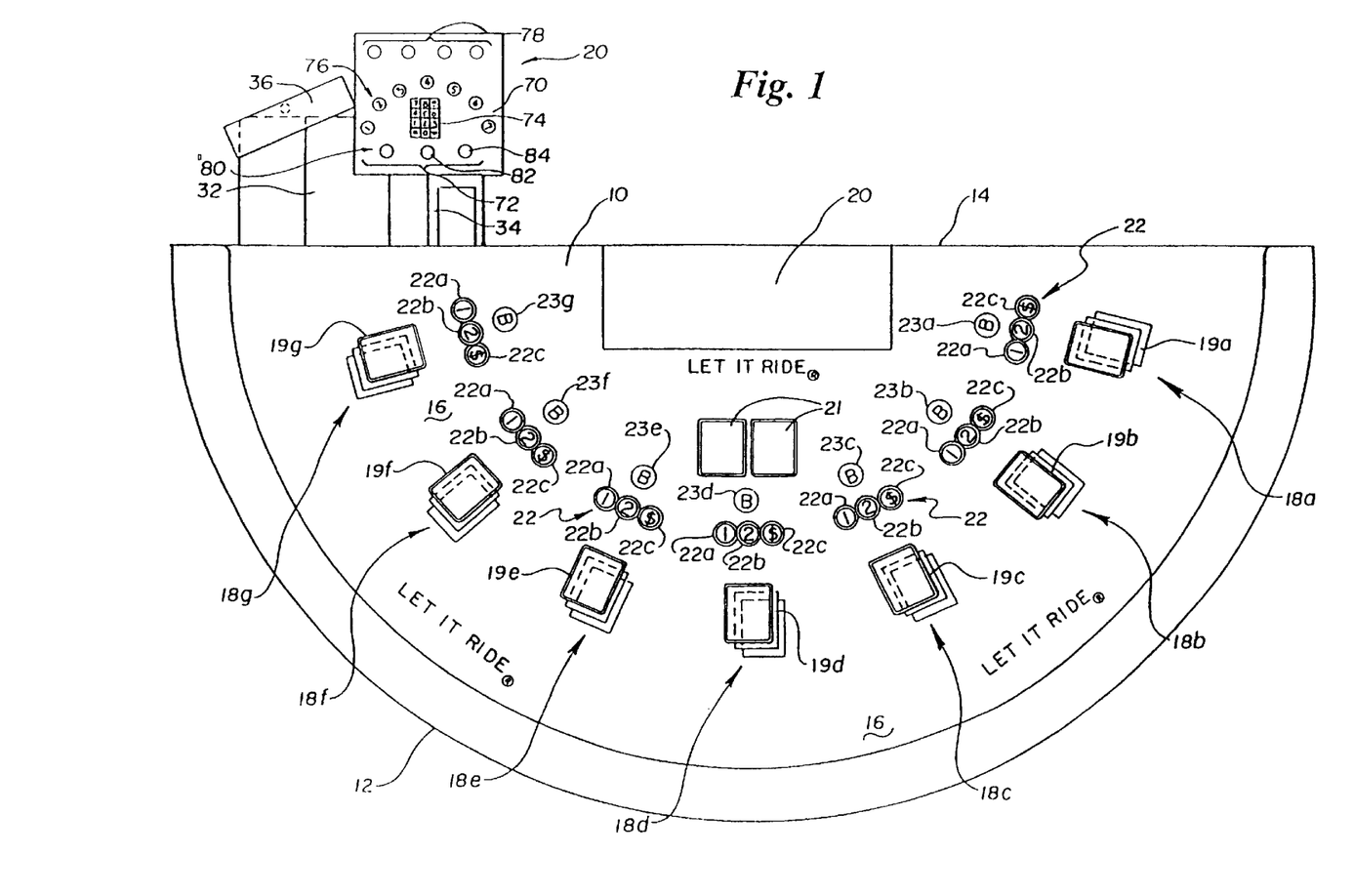
FIG. 1 depicts the table layout and apparatus used in playing a wagering game.

Referring to FIG. 1, the apparatus of the present invention includes a gaming structure which may be a typical casino gambling or gaming table 10. The table 10 has a curved side 12 for accommodating up to seven players and a straight side 14 for accommodating the dealer. The table 10 has a flat surface 16 having a top and a bottom. The top of surface 16 is covered with felt or other appropriate material. Although seven playing positions or locations 18a–g for individual players are provided, it is not essential to the game that exactly seven persons play and as many as sixteen players or as few as one may participate. For casino play, a field of seven players provides for a game that is easily manageable by the dealer and house, and one in which the individual players feel more involved. A house dealer position 20, including an area suitable for displaying the dealer's common cards 21, is provided.

Each table 10 has pre-determined locations or zones for receiving gaming tokens for wagering on the basic game and predetermined locations for zones for receiving gaming tokens for wagering on the additional games at each player station. As shown in FIG. 1, each of the playing positions or stations 18a–g includes a wagering zone 22, comprising three separate and distinct wagering or betting areas 22a, b, c, for receiving or placing a wager in the basic game. Each position 18a–g also includes a card area 19a–g for receiving and displaying cards dealt to the player occupying the position. A suitable wagering area or apparatus for receiving or indicating a wager in the additional game, playoff or tournament, is represented at area 23a–g. The wagering areas 22a, b, c and 23a–g receive appropriate wagering indicators or settling means such as gaming tokens or chips (not shown).

At one side of the dealer station 20, the apparatus for playing the multi-tiered game may include a microprocessor or computer controlled shuffling machine 32 supported by a table extension 34. The shuffling machine 32 may be of the type disclosed in U.S. Pat. No. 4,807,884, the disclosure of which patent is incorporated herein by reference. The shuffling machine 32 may include a dealing module for automatically and sequentially dealing cards and also may include a display means for displaying wagered amounts, the identity of winning players, or other game related information, including the jackpot amount.

Figure 2:
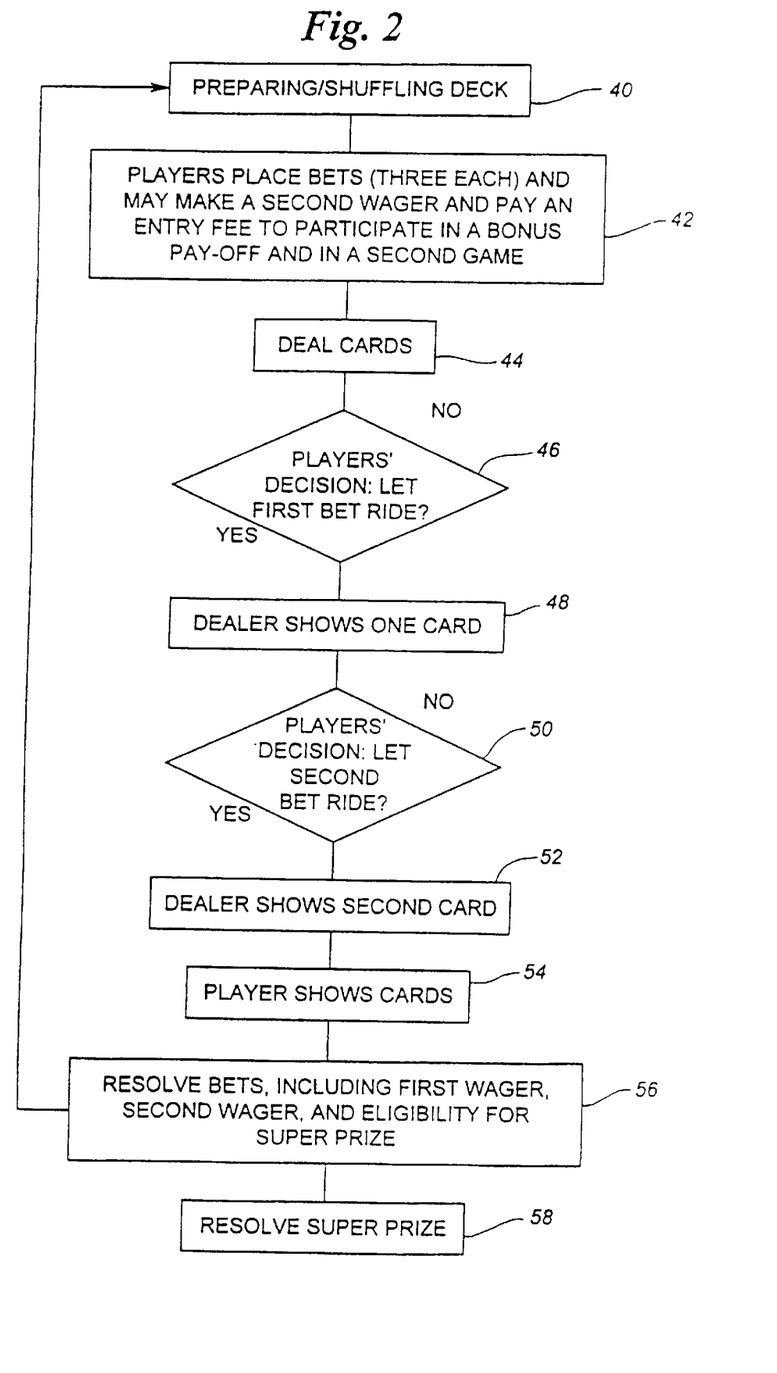
FIG. 2 is a block diagram representing the flow of play in the wagering game.

Referring to the flow diagram of FIG. 2, the initial step in playing the basic game LET IT RIDE® is preparing or shuffling a deck of cards, represented at block 40, by activating the shuffling machine 32 or by hand-shuffling a deck to provide a shuffled deck. Next, the players place a three-part initial wager, block 42, by putting equal amounts in each of the three betting areas 22a, b, c. Two of the parts of this initial wager, the parts placed in wagering area 22a and 22b, are retrievable at the option of the player. The third portion placed in area 22c is a nonwithdrawable bet. Players may also place an optional additional wager or extra fee, block 42, to participate in an additional game. After the placing of the wagers by each player, the cards are dealt, block 44, three cards being dealt down to each player and two cards are dealt down in front of the dealer.

The players inspect or "sweat" their cards in preparation for reaching decision block 46. At decision block 46, the players are queried by the dealer about whether the first part of the initial wager, the part placed in wagering area 22a, should be left or whether the player wishes to withdraw that portion of the wager. Each player makes the decision at decision block 46 on the basis of the three cards forming the player's incomplete hand at this point. Once each player has been queried and has decided whether or not to let the first portion of the bet ride, and those bets the player chooses to retrieve or remove are physically removed from area 22a and returned to the player, the dealer shows one of the down common cards, as represented at block 48. Now, each player has four cards to consider, the three cards dealt to that player originally and the single common card showing on the table 10. Each player must then decide whether to let the second part of the initial wager ride or whether to withdraw it from the game. After each player is queried and decides what to do with regard to the second part of the bet, and those bets to be withdrawn are physically removed from area 22b and returned to the player, the dealer reveals the second common down card, as represented at block 52. Each player now has a five card hand comprised of the three cards each player was originally dealt plus the two revealed common cards. The third bet, the bet placed at wagering area 22c, is a nonretrievable portion of the initial bet and the flow of the basic game proceeds to block 54 wherein the players show or reveal their three cards to the dealer.

The dealer resolves each player's initial wager (which includes all three parts, the second and third parts or only the third part, depending on the player's choices during play of the hand) based on the five card hand at block 56 and determines what payout, if any, the player is entitled to receive according to the payout schedule at the particular gaming table or casino. Bets on non-winning hands are collected by the dealer or house. The hand is then over, and the flow of the basic game returns to block 40, preparing and shuffling the deck for a new hand.

The award or payoff is given for each part of the initial or basic game bet that was allowed to ride to the end of the hand and for the nonwithdrawable part of the bet. A typical pay table would be as follows:

| | |
|---|---|
| Pair, Tens or Better | 1–1 (even money) |
| Two Pairs | 2–1 |
| Three of a Kind | 3–1 |
| Straight | 5–1 |
| Flush | 8–1 |
| Full House | 11–1 |
| Four of a Kind | 50–1 |
| Straight Flush | 200–1 |
| Royal Flush | 1,000–1 |

With regard to the additional wagering game and method, along with placing an initial game wager, block 42, the players may place an additional wager or entry fee, thereby placing an optional side bet of a fixed, predetermined amount to become eligible to win a bonus pay-off and to participate in a tournament to become eligible to win a super jackpot (the basic game and the additional wagering game are collectively referred to as the "multi-tiered wagering game"). It is this wager that is sensed and registered by the proximity switch apparatus of the present invention, although the invention could be utilized to register other wagers as well. The game flow then proceeds as represented in blocks 44–56. At block 56, along with resolving each player's basic game bet, the dealer also resolves the second wager or side bet which includes eligibility to continue in a playoff or tournament game to win a super jackpot. The second wager is resolved by the dealer immediately paying out a bonus payout to participating players according to a table. A typical bonus pay table would be as follows:

| | |
|---|---|
| Straight | $25.00 |
| Flush | $50.00 |
| Full House | $100.00 |
| Four of a Kind | $200.00 |
| Straight Flush | $2,000.00 |
| Royal Flush | $20,000.00 |

Each player participating in the additional wagering game and having a final hand comprising, in the preferred embodiment, the highest one hundred winning hands registered by participating players over a given period, becomes eligible to continue tournament play to win a super jackpot, represented at block 58.

The basic wagering game and additional game may be a lottery type game, any suitable wagering game or any suitable random process through which eligible finalists are selected and through which one of the eligible finalists is identified as the super jackpot winner. The basic game and the additional game which culminates in a winner of the super jackpot may be different games, and the second game may be played at a different place than the basic game.

The super prize or jackpot is a fixed amount set at least prior to the commencement of the second game and may be comprised of the optional second game wagers or entry fees, or a portion thereof, accumulated for a selected period. Where the super jackpot is comprised of accumulated entry fees or side bets, or a portion thereof, the jackpot total may increase until the occurrence of a selected event such as the jackpot reaching a predetermined amount, a predetermined period of time has elapsed, or a predetermined number of finalists has been identified. After the occurrence of the selected event, but prior to the commencement of the second game, the jackpot amount is made known to the players. Where a fixed amount of money is allocated to fund the super jackpot prior to the commencement of the additional game, the jackpot amount can be made known to the players prior to the commencement of the basic game.

The selected period for funding a super jackpot must insure that a substantial number of players qualify for winning the super jackpot, and that a substantial jackpot, for example, a million or multi-million dollar jackpot, accumulates. Ideally, the selected period is at least one month, but a typical period would be three months, particularly if the funding program or schedule set forth below is followed. Eligible finalists in the second game, i.e., all the eligible basic game players having a final hand comprising the highest one hundred hands, are accumulated during a qualification period equal to the jackpot accumulation period. If no royal flush has been achieved during the selected accumulation period, the next highest winning hands are used to determine eligibility for the second game. Another method that could be used to determine eligible finalists in the second game would be to have each player registering a royal flush over a given time period to become eligible. Once the selected event has occurred the jackpot or prize pool is established and the super jackpot amount is fixed.

A typical funding program for a super jackpot when it is comprised of accumulated fixed side bets or entry fees may be outlined as follows. A one dollar ($1.00) fixed side bet or entry fee could be required to participate in the bonus pay-off and the second game. Of this amount, forty-five cents ($0.45) could be used to fund immediate bonus pay-outs to players, the bonus payouts being based on a random outcome or certain poker rankings as set forth above. Fifty-five cents ($0.55) could be used to fund the super jackpot.

The multi-tiered wagering game and method is not limited to being played with five card stud poker games, but may be applied or used with other appropriate wagering games such as other poker games or games of chance. The method for the multi-tiered wagering game does not require a shuffling machine 32, dealing module 33 or a display means 36. However, when the multi-tiered wagering game is played with a card game, these features facilitate and expedite the play of the game as well as add security (game protection), efficiency, and interest. The fee for participation in the additional wagering game may be in an amount other than one dollar, and the funding schedule set forth above may be varied. Where the super jackpot is funded by accumulated fixed side bets or entry fees, the accumulation period may also be varied, as long as a jackpot sufficient to interest players accumulates. For example, the accumulation period may be a selected time period, may be based on the accumulation of a particular amount of money, or may be based on the accumulation of a certain number of finalists.

The following instructions set forth the conceptual design and procedures for a tournament in a casino environment, wherein the jackpot is funded by a portion of the accumulated entry fees:

Before the basic LET IT RIDE® game is played, players may elect to pay a $1 entry fee per hand to participate in the LET IT RIDE® Tournament. If they pay the entry fee and get a straight or higher, they will be eligible for bonus payments as follows:

| | |
|---|---|
| Royal Flush | $20,000 |
| Straight Flush | $2,000 |
| Four of a Kind | $200 |
| Full House | $100 |
| Flush | $50 |
| Straight | $25 |

The payout numbers are for illustration purposes only and in actual practice could be higher or lower.

Example: If a player makes three $5 bets on LET IT RIDE® and hits four of a kind, he will receive $750 for that bet (50 to 1). If he had also paid the $1 tournament entry fee for that hand, he would receive a $200 bonus for a total payout of $950.

If a player hits a royal flush, he will be paid 1,000 to 1 for his basic bet. Again, using three $5 bets as an example, the player would win $15,000 for his basic bet and, if he had paid the $1 tournament entry fee for that hand, he would receive a $20,000 bonus for a total payout of $35,000.

The hit frequency shows that 45¢ of the $1 entry fee will be required to finance the bonus payment schedule. The remaining 55¢ will be put into the super jackpot pool.

The first round of the tournament will last for a predetermined length of time (e.g., three months). At the end of that period, the players with the one hundred highest hands (plus ties) will qualify for round two of the tournament. Rounds two through five (the final round) would take place over a two day period at a host casino. All of the qualifiers that return and participate in round two of the tournament will receive a bonus (i.e., $5,000) regardless whether they win or lose.

Two Day Playoff:

Day One/Round Two—Each player will be given an equal amount of non-redeemable chips in various denominations. At the end of 50 hands, the 50 players (plus ties) with the highest winnings will advance to round three and will receive another bonus (i.e., $10,000).

Day One/Round Three—The 50 remaining players will reassemble at the tables and again be issued an equal amount of non-redeemable chips. The winnings from the previous round will not be carried forward. After 50 hands have been played, the 25 players (plus ties) with the highest winnings will advance to round four and receive another bonus (i.e., $15,000).

Day Two/Round Four—The 25 remaining players will return to the tables and will be issued an equal amount of chips. After 50 hands, the five players with the most money will advance to round five (the final round). Since the final round cannot have more than five players, a ten hand tie-breaker round will be played between players trying for the fifth seat.

Day Two/Round Five (Final Round)—The five finalists will receive an equal number of chips and play at the same table. At the end of 50 hands, the players are ranked according to the total value of the chips they have accumulated. The payouts will be distributed as follows:

| | |
|---|---|
| 5th Place | $1,000,000 |
| 4th Place | $1,500,000 |
| 3rd Place | $2,000,000 |
| 2nd Place | $2,500,000 |
| 1st Place | Fixed amount larger than second place or balance of super jackpot pool |

The balance is the balance of the super jackpot pool after all other prizes have been deducted. While this balance is not fixed at the beginning of play of the basic game, it is fixed prior to the beginning of round two of tournament play. The payout numbers are for illustration purposes only and in actual practice could be higher or lower.

Irregularities in The Tournament:

1. At the end of each round, only players with chips remaining are eligible for the next round, e.g., if only forty players have chips remaining after round two, then only those forty players may advance to round three.

2. If, during the final round, several players lose all of their chips before the round is over, they will be ranked in the order they lost their chips, e.g., the first player to lose all his chips will take seventh place, the second player to lose his chips will be in sixth place, etc.

3. If two or more players lose their chips on the same hand, those players will tie and the prize money will be divided equally, e.g., if the first two players to lose all of their chips do so on the same hand, they would tie for fourth place. The prize money for the 4th and 5th places would be added together and divided equally among the two players.

Dealing Procedures

1. Before proceeding with each hand, the dealer asks "any tournament entries?" and allows each player time to place his entry fee in the designated area. The player may place either his basic game wager or his optional wager and tournament entry fee on the table first—the order does not matter.

2. The dealer ensures that the red entry fee lamp, or other suitable display means, on the gaming table is on for each player who has placed an optional wager and an entry fee.

3. The dealer then verifies the accuracy of each player's bet by confirming that an equal amount is placed on each of the three wagers.

4. The dealer now touches a "no more fees" switch or the "Begin Game" switch on the table control panel. Once this is done, players may not change their wagers or entry fees in any way.

5. The dealer collects the optional wager and entry fees and places them in the chip rack. (Without the dealer having to take any action, once the last coin from the optional wagers and entry fees is collected, a signal is sent to the shuffler and it automatically moves the freshly shuffled deck forward to the pre-count counting position.)

6. The dealer takes the deck from the discard rack and places it in the shuffling area of the automatic shuffler. (Once the cards are placed in the shuffling area, the shuffler automatically counts the first three cards into the forward position.)

7. The dealer takes the three cards from the front of the shuffler and places them face down on the table in front of the first player on his left, spreading the cards to verify that exactly three cards were dealt.

8. The dealer now takes the next three cards from the front of the shuffler and places them face down in front of the second player from his left, spreading them out to verify the number of cards. The dealer follows this procedure clockwise around the table until each player who has made a wager receives a three card hand.

9. After each player has received three cards, the dealer places the next three cards from the shuffler face down in front of himself. (Although only two cards are used, the automatic shuffler is programmed to dispense three cards). These cards remain in a stack so that the two bottom cards are hidden by the top card. The stack is placed in the left hand rectangle of the two rectangles on the layout in front of the dealer.

10. The dealer touches the "card count" switch on the shuffler. The shuffler counts the remaining cards while moving them to the forward position. Before the dealer picks up the cards, he must determine whether or not the count is accurate. If the card count light glows green, the count is accurate. If the card count light flashes red, there is a miscount.

11. In case of a flashing red light, the dealer calls a floor supervisor for instructions before proceeding. (see "irregularities" below.)

12. If the card count light glows green, the dealer may remove the balance of the cards from the shuffler and place them in the discard rack.

13. While waiting for the card count light, the dealer begins the round with the first player on his left. The dealer allows each player in turn the option to reclaim his first bet or to let it ride. The dealer must not allow players to reach out and retrieve their own bets. If a player does this, the dealer should politely ask him not to do so in the future. Only the dealer can return bets to a player.

14. After the first round of options, the dealer takes the top card from the stack in front of him and places it on top of the cards in the discard rack. Then he turns over the second card, placing it face up covering the bottom card. The bottom card should not be visible.

15. Again, starting on his left, the dealer gives each player in turn the option to reclaim his second bet or to let it ride. The dealer asks the players to place their hands face down either near, against, or under their chips until the hand is over.

16. The dealer moves his up card to the right hand rectangle on the layout in front of him. The dealer then turns over his bottom card. There should now be two up cards in front of the dealer representing the community cards for the players.

17. Starting with the player on his right, the dealer turns over that player's hand and determines if it is a winning hand according to the payout schedule for the basic LET IT RIDE® game. If the player does not have a winning hand, the dealer collects the remainder of the player's wager and places it in the chip tray. If the player does have a winning hand according to the LET IT RIDE® payout schedule, the dealer pays the player the amount indicated on the schedule.

18. To determine the bonus payment, the dealer touches the key on the control panel which indicates the player's position (the light will begin to flash). The dealer touches the key representing the player's hand. The dealer touches the enter key. The dealer then looks at the instruction window for the next step (i.e., whether to pay the player or notify a floor supervisor, what amount to pay, etc.).

19. Once a bonus has been paid to a player and approved by the appropriate casino authorities, the dealer collects that player's cards and places them face down in the discard rack. The dealer touches the enter key again. The dealer then moves on to the next player from his right (counter-clockwise) and follows the same procedures outlined in steps 18 through 21.

20. When the dealer finishes with the last player (the first player on his left), he collects those cards and the two community cards in front of the dealer and places them face down in the discard rack. The dealer then touches the "Game Over" switch on the control panel.

Irregularities in Dealing Procedures:

1. Entry Fee Light:

If a player puts up his $1 wager (in the form of a metal gaming token provided by the casino) for his entry fee and his entry fee light does not activate, the dealer calls a floor supervisor for instructions. The supervisor then closes that position for play.

2. Too Many or Too Few Cards in Deck:

If the automatic card count light on the shuffler is flashing red after it has counted out the cards, the dealer calls a floor supervisor. The floor supervisor removes the cards from the discard rack and does a hand count on the table (adding in the cards that have been dealt to the players) to determine whether the card count is accurate. If the count results in fewer or more than 52 cards, the round is declared a misdeal and all of the cards are collected. The floor supervisor removes the deck from the game and seals it to be held for further examination, if necessary. The supervisor then installs a new deck of the same color following the new deck dealing procedures.

3. Auto Shuffler Miscount:

Even if the automatic shuffler shows an accurate count, if any player has more or less than three cards, it is still considered a misdeal and a dead hand. The deck is removed and a floor supervisor is called.

4. Player Has Too Many or Too Few Cards in His Hand:

If any player has too many or too few cards (more or less than three) in his/her hand, the round will be declared a misdeal. The cards will be collected and new hands will be dealt from a new deck.

Bonus Payments and How to Pay Them

As stated previously, if a player has paid the $1 optional wager and entry fee and his hand consists of a straight or higher, he is eligible for the following cash bonus payments:

| | |
|---|---|
| Royal Flush | $20,000.00 |
| Straight Flush | $2,000.00 |
| Four of a Kind | $200.00 |
| Full House | $100.00 |
| Flush | $50.00 |
| Straight | $25.00 |

If a player has a straight ($25) or a flush ($50), the dealer pays the bonus from the chip tray upon verbal approval of the floor supervisor.

If a player has a full house ($100) or four of a kind ($200), payment is made upon approval of the pit boss.

If a player has a straight flush ($2,000) or a royal flush ($20,000), approval of the pit boss and the shift supervisor or casino manager is required before making payment.

Optional Wager and Entry Fee

Amount: $1 per hand paid prior to receiving cards.
Token: $1 value metal gaming token provided by the casino.

Since the object of round one of the tournament is to get one of the hundred highest hands dealt during the posted time period, players may enter every time they play the basic LET IT RIDE® game.

Fifty-five cents of each $1 entry fee collected by the casino is remitted to the tournament organizer. The remaining 45¢ is retained by the casino. Each casino is responsible for paying any bonuses the entrants may qualify for during round one. If the bonus awards paid by a casino are less than the amount collected, the casino is entitled to keep the money as its own. If the bonus awards paid out exceed the money collected by the casino, the casino must make up the difference.

The 55¢ emitted to the tournament organizer is deposited into a holding account. This money constitutes the prize money available to be paid to players as they advance to rounds two through five.

Qualifying Hands

Only the player who receives a qualifying hand is allowed to advance to rounds two through five. Qualifiers for any round may not sell, donate, or in any way transfer their rights to continue in the tournament.

If a qualifier is unable to continue in the tournament for any reason whatsoever—including death—no one will be allowed to substitute for that person and continue in his place. (This rule is intended for the protection of the tournament qualifiers as well as the integrity of the tournament.)

If a player has more than one qualifying hand, only his or her highest hand will be allowed to advance to round two.

A qualifying hand may not be used in any tournament other than the one in which it is received.

Registering Qualifying Hands

In addition to the normal IRS paperwork, all straight flush and royal flush bonus winners must complete the "LET IT RIDE® Bonus Winner Form". If a player does not complete this form, then he will not be considered a qualifier for round two.

If a player who gets four of a kind and has paid the entry fee wants to register as a potential qualifier for round two, then he must complete the "LET IT RIDE® Bonus Winner Form" in full.

In addition, each player must be photographed with a polaroid camera. The player must sign the back of the photo. The photo is submitted to the tournament organizer along with the "LET IT RIDE® Bonus Winner Form".

Upon completion of the paperwork, the pit boss or shift boss must notify the tournament organizer by phone with the following information:

Person Calling
Casino Name
City
Time
Date
Player's Name
Type of Hand
Form Number The tournament organizer must receive an original or facsimile of the form and photo within 48 hours.

The multi-tiered wagering game of the present invention, including the LET IT RIDE® game aspects thereof, might be played live with a dealer at one or more gaming tables in one or more casinos, or in casinos, homes, and other locations in interactive electronic or video form with automatic coin or betting means symbols, receptacles and payout capability, wherein appropriate symbols for cards, wagers, or score keeping would be displayed electronically.

With reference to the FIGS. 1 and 2–9, a more detailed description of the apparatus for playing the multi-tiered wagering game in conjunction with the LET IT RIDE® game follows. The apparatus of the present invention which is for detecting the presence of a gaming token will be described later as part of the apparatus for playing the multi-tiered wagering game. As shown in FIG. 1, a playing table 10 has seven player positions 18a–g. Each of the playing positions 18a–g includes a wagering zone 22, comprising three separate and distinct wagering or betting areas 22a, b, c, for receiving or indicating a wager in the basic game. Also, each position 18a–g includes a card area 19a–g for receiving and displaying cards dealt to the player occupying the position. A suitable wagering area or apparatus for receiving or indicating a wager and entry fee in the multi-tiered wagering game (i.e., the bonus pay-off and the second game, playoff or tournament) is represented at area 23a–g. The wagering areas 22a, b, c, and 23a–g may be designed to receive appropriate wagering indicators or settling means such as gaming tokens or chips (not shown). Prior to each hand of the LET-IT-RIDE® game, or related table game, each player at the table 10 must decide whether to enter the multi-tiered wagering game by placing a gaming token in wagering area 23a–g. Placing a gaming token in wagering area 23a–g indicates that the player has entered the additional game which is part of the multi-tiered wagering game.

At one side of the dealer station 20, the apparatus for practicing the method of the multi-tiered wagering game may include a microprocessor or computer controlled shuffling machine 32 supported by a table extension 34. The shuffling machine 32 may be of the type disclosed in U.S. Pat. No. 4,807,884, the disclosure of which patent is incorporated herein by reference. The shuffling machine 32 may include a dealing module for automatically and sequentially dealing cards and also may include a display means for displaying wager amounts, the identity of winning players, or other game related information, including the jackpot amount.

Also, FIG. 1 shows a dealer control panel 70. The dealer control panel 70 includes four sets of inputs: the game status inputs 72; the keypad 74; the player position inputs 76; and the winning hand inputs 78. The game status inputs 72 allow the dealer to enter information on the status of the multi-tiered game. The dealer depresses the "Begin Game" button 80 when all players at the table have made their betting selections prior to the start of each game. At this time, the player betting information is sent to the facility computer 86 (see FIG. 4).

When the game is over, the dealer depresses either the "Game Over" button 82 or the "Winner" button 84. Selection of the "Game Over" button 84 resets a proximity sensor devices 118 (which will be described later) where one proximity sensor device 118 is aligned with and in sensing proximity to a wagering area 23a–g, and betting for a new game is initiated. The dealer selects the "Winner" button 84 when one or more players participating in the additional game of the multi-tiered game have one of the winning hands. Next, a security code is entered on the keypad 74. For lower payout winners, the dealer will have a unique security code to enter. For the highest payout hands, the pit boss or shift manager will have a different unique security code. Therefore, one of these supervisory managers confirms the high payout hand before the information is entered and the payout is made. For example, the two different security codes are four-digit codes distributed daily.

Next, the dealer inputs the player position 18a–g of the winning hand by selecting the corresponding player position input 76 for the winning player. Finally, the dealer inputs the winning hand by selecting the appropriate winning hand input 78.

In an alternative embodiment, the keypad 74 is also used to activate or disable the multi-tiered gaming inputs 23a–g, 72, 76, 78 at a table 10. A specific four-digit code disables all of the multi-tiered game inputs 23a–g, 72, 76, 78 at the gaming table 10 and another four-digit code activates the multi-tiered gaming inputs 23a–g, 72, 76, 78 at a table 10.

Figure 3:
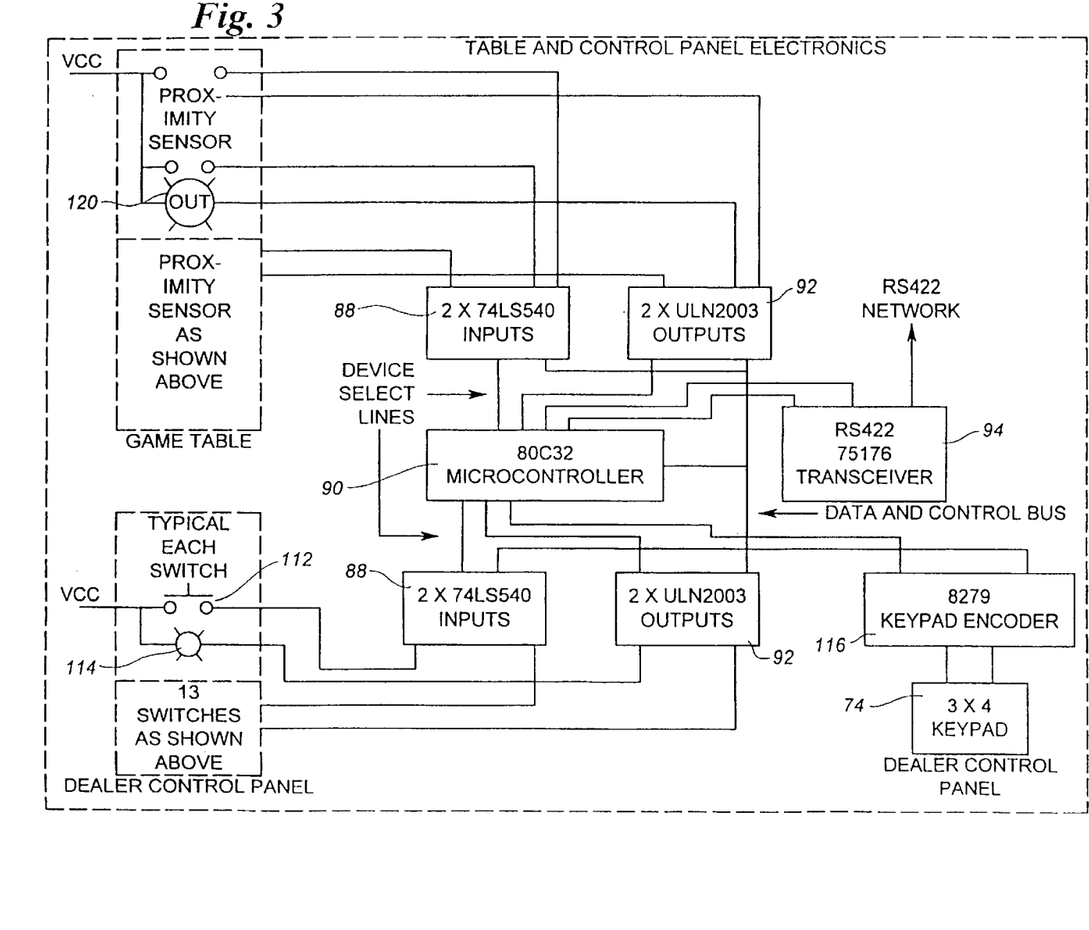
FIG. 3 is a schematic diagram of the player selection inputs and dealer control panel.

FIG. 3 shows the player input and dealer control panel circuitry. Each proximity sensor device 118 (which will be described later in this specification), one such device is located under each of the wagering areas 23a–g, is connected through an input device 88 to a microcontroller 90. An example of input device 88 is an Inverting Octal Tri-state Buffer, available from National Semiconductor, Santa Clara, Calif. 95051. The microcontroller 90 may be selected from a variety of commercially available microcontrollers such as the 80C32 microcontroller, available from Intel Corporation, Santa Clara, Calif. When the presence of a gaming token is detected by the proximity sensor device 118, the microcontroller 90 turns on the LEDs 146 through the output device 92. When the LEDs 146 which surround the proximity sensor light up, the LEDs 146 signal to the player and the dealer that the bet placed by the player for entry into the second game has been registered by the microcontroller 90. An example of output device 92 is a Darlington Array, available from Allegro Microsystems Inc., Worcester, Mass. 01615.

When all of the players at a table 10 have made their betting selection with regard to the additional game of the multi-tiered game, the dealer depresses "Begin Game" button 80 on the dealer control panel 70. The encoded betting information is sent from the microcontroller 90 to an RS422 transceiver 94 and, referring to FIG. 4, the encoded betting information is sent over network 96 to the facility computer 86. The facility computer 86 can be one of numerous commercially available personal computers generally having a monitor, microprocessor, information storage, and I/O ports, for example, an IBM PS/1, available from IBM, Armonk, N.Y.

Figure 4:
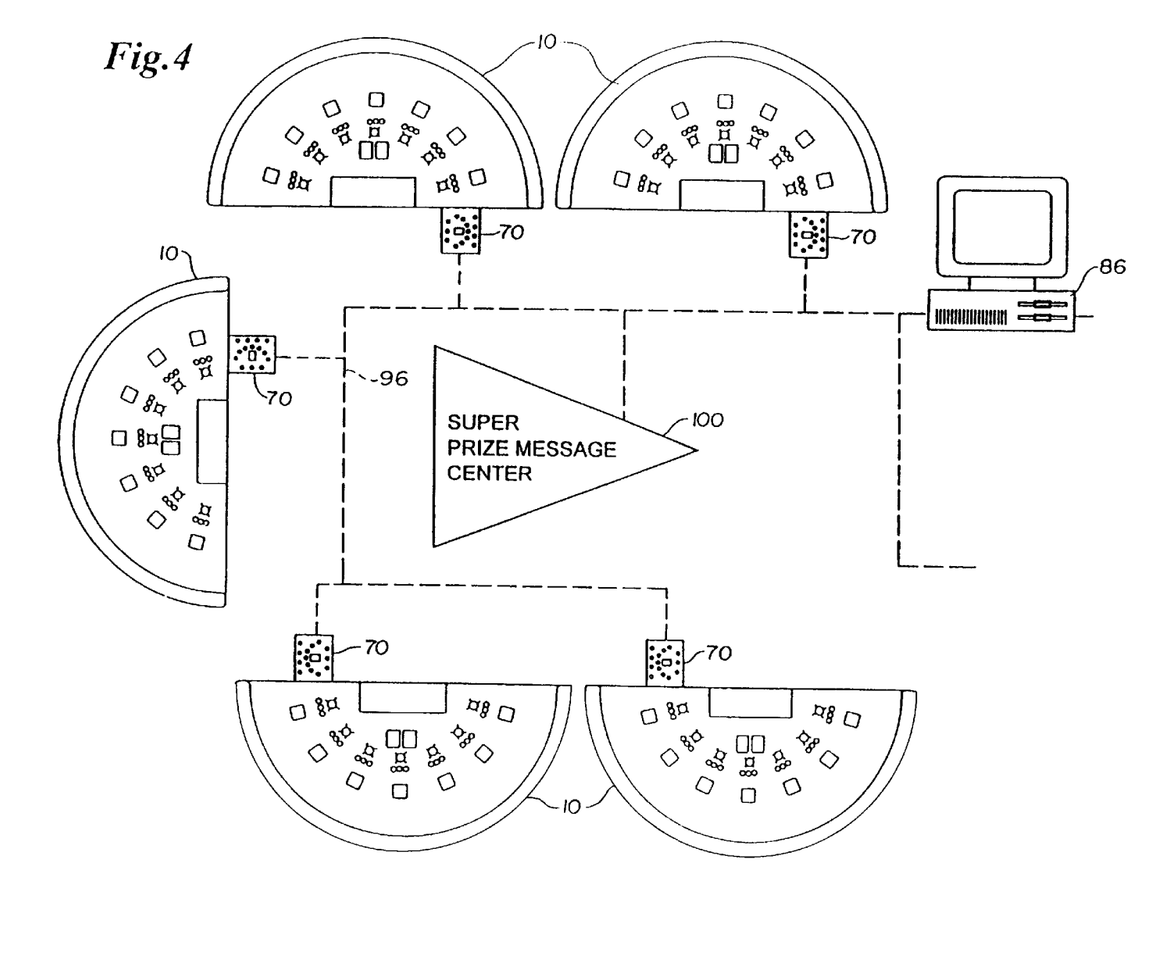
FIG. 4 shows gaming tables connected to a facility computer by a network.

As shown in FIG. 4, the facility computer 86 receives betting and winning hand information from all of the tables 10 connected to the network 96. Generally, a maximum of thirty-two devices can be connected to the facility computer 86 via the RS422 interface network. Therefore, a facility having more than thirty-two gaming tables 10 equipped for multi-tiered gaming will have more than one facility computer 86.

Figure 5:
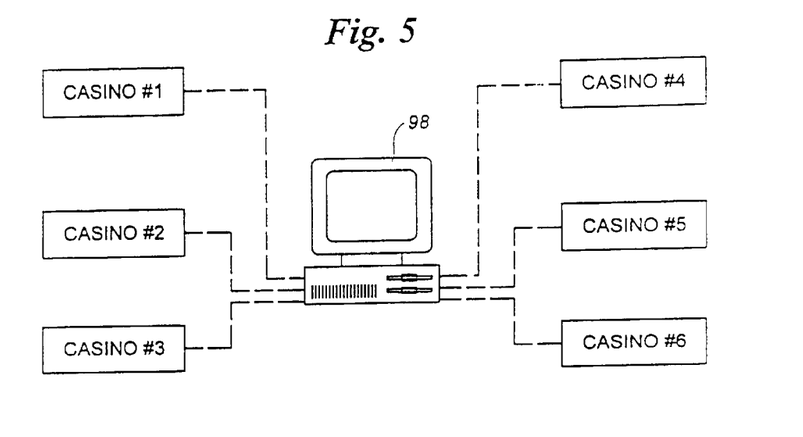
FIG. 5 shows a plurality of facility computers linked to the central computer.

As shown in FIG. 5, the facility computers 86 are electronically linked to a central computer 98 by telephone lines or other circuitry well known to one of ordinary skill in the art. The central computer 98 may be located at a site separate from all of the facility computers 86 or co-located at one of the gaming facilities. The central computer 98 may also be one of the generally available personal computers such as the IBM PS/1 available from IBM. In an alternative embodiment of the invention, one of the facility computers 86 acts as both the facility computer 86 for a gaming facility and as the central computer 98.

The central computer 98 receives all of the betting and winning hand information from the facility computers 86 and computes the multi-tiered jackpot amount. The central computer 98 receives the number of bets and number and type of winners from each gaming table 10. A unique address identifies each table 10 at each gaming facility. The central computer 98 includes a data base and associated accounting software. The data base allows the central computer 98 to compare the number of actual payoffs to the anticipated number of payoffs to detect any cheating or other irregularities at any of the tables or facilities. The central computer 98 can generate a variety of accounting reports on each table or gaming facility on a daily basis. If the new jackpot amount is computed each time new betting or winning hand information is received by the central computer 98, then the new jackpot amount is sent to the facility computers 86 as soon as practicable. However, this new jackpot amount should be sent to the facility computers 86 at least every five minutes. It should be noted that the jackpot is preset for a minimum amount. Only when the betting exceeds a certain amount will this calculation affect the amount of the jackpot.

Figure 6:
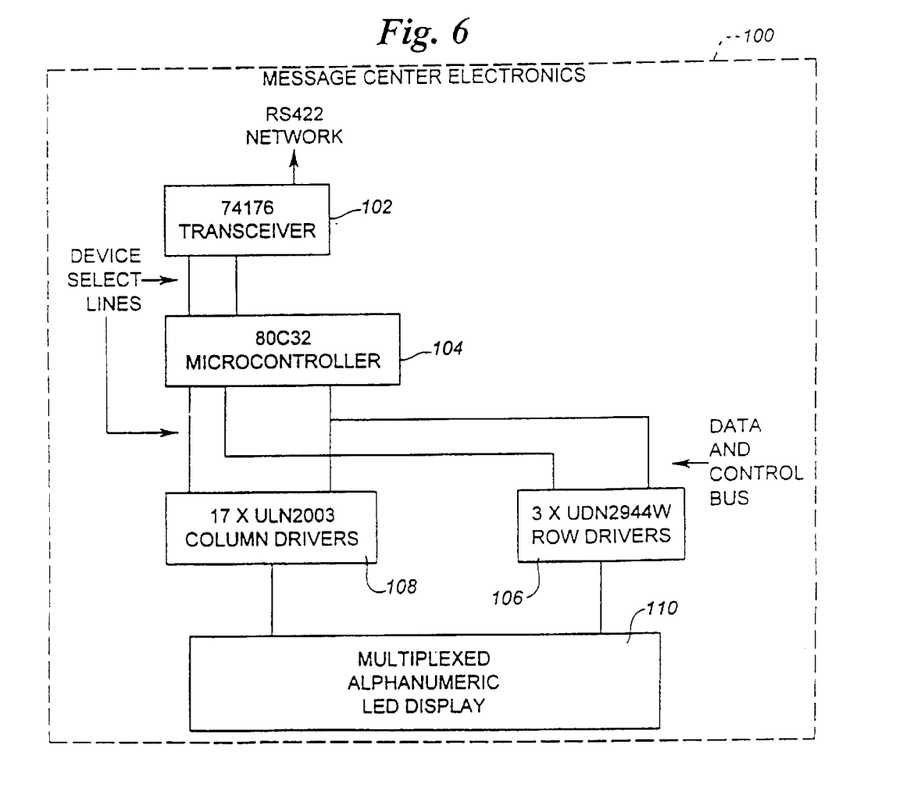
FIG. 6 is a schematic diagram of the display board.

As shown in FIG. 4, the facility computer 86 is also connected by the RS422 network to a display center 100. As shown in FIG. 6, the display center 100 includes an RS422 transceiver 102 connected to a microcontroller 104 which is the same type as used in the dealer control panel shown in FIG. 2. The facility computer 86 sends the jackpot amount over the network 96 to the display board microcontroller 104. The display board microcontroller 104 drives row drivers 106 and column drivers 108 to display the jackpot amount on a typical alphanumeric LED display 110. Column drivers 108 can be the same device as output devices 92, e.g., a Darlington Array, available from Allegro Microsystems Inc., Worcester, Mass. 01615. Row drivers 106 can be a Quad High-Current High-Voltage Source Driver, available from Allegro Microsystems Inc., Worcester, Mass. 01615.

As shown in FIG. 3, each of the game status inputs 72, player position inputs 76, and winning hand inputs 78 has a pressure-sensitive actuating switch 112 multiplexed through an input device 88 to microcontroller 90. Microcontroller 90 turns on input light 114 through output device 92 to show that the input has been selected.

At the end of the table game, e.g., "LET IT RIDE®," the dealer determines whether there are any game winners in the additional game of the multi-tiered game. For each winner the dealer selects the "Winner" button 84 on the dealer control panel 70. If the winning hand is one of the high payout hands, e.g., royal flush or straight flush, the dealer notifies either the pit boss or shift manager who confirms the winning hand and enters a security code on the keypad 74. Keypad 74 is selected from commercially available 3×4 keypads and is connected to microcontroller 90 by keypad encoder 116, e.g., Model 8279, available from Intel Corporation, Santa Clara, Calif. The dealer then depresses the player position input 76 corresponding to the player having a winning hand. Next, the dealer depresses the particular winning hand input 78, e.g. royal flush, straight flush, four of a kind, or full house. After all winning hand entries have been made, or if there were no winners for the hand, the dealer selects the "Game Over" button 82 and the next game can be initiated.

With reference to the FIGS. 1, 3, and 7–9, a more detailed description of the apparatus of the present invention follows. As shown in FIG. 1, the gaming table 10 has wagering areas 23a–g, where players place a gaming token to enter the additional game of the multi-tiered wagering game. A proximity sensor device 118, having a sensor 144 (as will be described with reference to FIGS. 7 and 8) is mounted to a gaming table 10 or in a video gaming machine such that the sensor 144 is aligned with and in sensing proximity to a wagering area 23a–g. Each sensor 144 is within sensing proximity of a wagering area 23a–g, which is between 0.8 mm to 50 mm (i.e., within 2 inches of the wagering area 23a–g). This distance can vary depending on the particular sensor 144 that is used. In the preferred embodiment, a proximity sensor device 118 is mounted is below a wagering area 23a–g and is mounted adjacent the bottom of the table surface 16.

As shown in FIG. 3, each of the proximity sensor devices 118 are connected to the micocontroller 90 through inputs 88. Moreover, a lighting device 146, which is in the proximity sensor device 118, is connected to the microcontroller 90 through the output 92, so that when the proximity sensor device 118 detects the presence of a gaming token in the wagering area 23a–g it monitors, the microcontroller 90 causes the corresponding lighting device 146 to light up.

Figure 7:
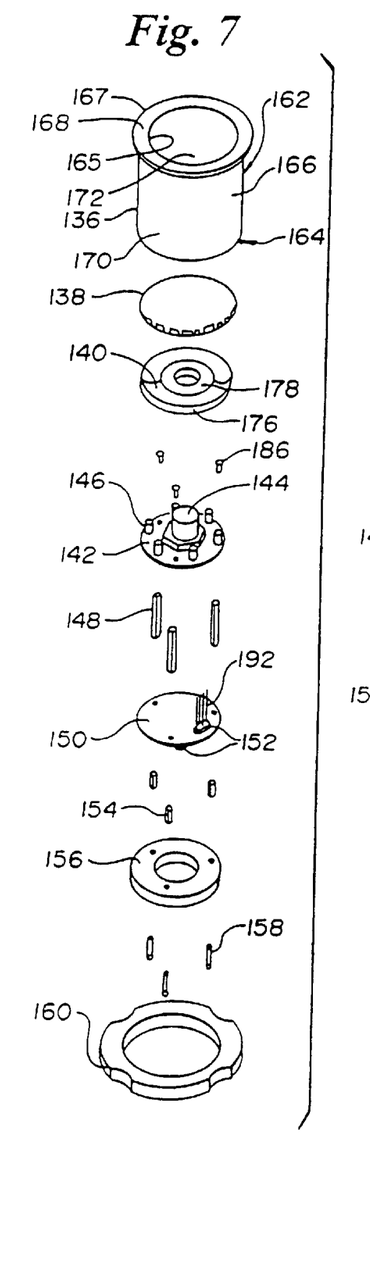
FIG. 7 is an exploded perspective view which shows the parts of a suitable proximity sensor device.
Figure 8:
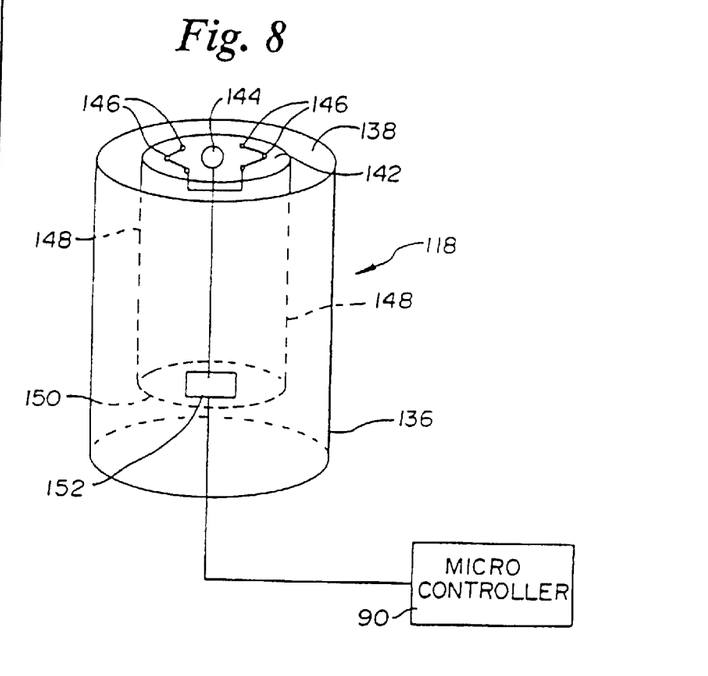
FIG. 8 is a schematic perspective view of an assembled proximity sensor device.

With reference to FIGS. 7 and 8, the proximity sensor device 118 will be described. The proximity sensor device 118 comprises a housing 136, a cover plate 138, a holder 140, a first board 142, a sensor 144, at least one lighting device 146, a first set of supports 148, a second board 150, a decoder connector 152, a second set of supports 154, a closing plate 156, fasteners 158, and a securing ring 160.

The housing 136 is constructed of aluminum and provides a casing for the sensor 144. The housing 136 has a top 162 and a bottom 164. In the embodiment shown in FIGS. 7 and 8, the body 166 of the housing 136 is cylindrical. The cylindrical body 166 has a circular cross section which has an inner diameter 165 and an outer diameter 167. The lip 168 located at the top 162 of the housing 136 extends into the cylindrical body. Moreover, the body 166 has an outer surface 170 and an inner surface 172. The outer surface 170 of the cylinder 166 has grooves (not shown) for receiving the securing ring 160.

The cover plate 138 is a plastic lens. The cover plate 138 is inserted into the housing such that it abuts the lip 168. The cover plate 138 protects the surface of the sensor 144 and abuts the bottom of the table surface 16 directly beneath a wagering area 23a–g.

The holder 140, which is inserted into the housing 136, receives the sensor 144. The holder 140 has an outer edge 176 and an inner edge 178. The inner edge 178 forms an opening 180 which receives the sensor 144. As shown in FIG. 7, the opening 180 is circular because the sensor 144 depicted in FIG. 2 is circular. However, this opening 180 may have any shape as along as the opening 180 can receive the sensor 144. Also, the holder 140 is made of material that allows light from the lighting devices 146 to be visible through the cover plate 138.

The sensor 144 and the lighting devices 146 are fastened to the first board 142. The first board can be made of any material which has the rigidity to support the sensor 144 and the lighting devices 146. This first board 142 must have a shape which will allow the board 142 to be inserted into the housing 136. In the embodiment shown in FIGS. 7 and 8, the first board 142 is circular and has a diameter 182 which is less than or equal to the inner diameter 165 of the housing 136.

The sensor 144 may be a type of proximity sensor. Several types of proximity sensors may be used in the present invention including, but not limited to, inductive proximity sensors, capacitive proximity sensors, and ultrasonic proximity sensors.

Proximity sensors are used as the sensor 144 (1) because a gaming token or the like may have to be sensed through non-metallic barriers such as glass, plastic, or felt; (2) because of the repetitive nature of the application in having to repeatedly detect the presence of a gaming token at the beginning of each game, a reliable sensor with a long life is required; and (3) because, particularly in video gaming, a sensor which can respond rapidly and switch quickly may be required since the gaming token or coin may only be present in the area sensed by the sensor for a very short period of time.

Inductive sensors may be used to detect metallic objects. Since gaming tokens used in casinos contain metal, inductive proximity sensors may be used. An inductive proximity sensor creates a high frequency field in front of the sensor 144. When a metal object enters this high-frequency field, the amplitude of the oscillation creating the field is reduced. The sensor recognizes this change in amplitude and outputs a signal accordingly.

However, if gaming tokens which contain no metal is used, then capacitive and ultrasonic proximity sensors may be used. With capacitive proximity sensors, the change in capacitance is measured. When an object (metallic or non-metallic) is present, the capacitance increases, thereby allowing the detector to signal, accordingly.

An ultrasonic sensor may also be used to detect any object because it emits an ultrasonic pulse which is reflected back by any object entering the zone in which such a pulse is emitted. The sensor's output is dependent on the amount of time taken for the reflected wave to return.

In the preferred embodiment, because gaming tokens generally have a metallic content, an inductive proximity sensor is used. The inductive proximity sensor provides the additional security of only detecting metal, thereby preventing people from trying to fool the detector with objects other than metal.

Also, these sensors 144 are mounted in sensing proximity to a wagering area 23a–g. Generally, a sensor 144 will be within 2 inches of the wagering area 23a–g the sensor 144 is monitoring. The actual distance between the sensor 144 and the wagering area 23a–g varies based on the selection of a proximity sensor 144.

The lighting device 146 may be any type of light producing element. In the preferred embodiment, a light emitting diode ("LED") is used. In fact, as shown in FIGS. 7 and 8, six LEDs are used in the present invention. This lighting device 146 is not necessary for detecting the presence of a gaming token. However, they provide (1) a visual indication to the dealer and the player that a bet has been registered; and (2) an easy target for the cameras monitoring a table 10 so that the computer's registration of a bet can be visually verified by the camera.

The sensor 144 is secured to the first board by a bolt 82 (shown in the inset to FIG. 8). The LEDs may be secured to the first board 142 by simply placing them in the openings created in the first board 142 for receiving such devices 146.

A second board 150 is attached to the first board 142 by the first set of supports 148. The supports are aluminum supports which are secured to the first plate 142 by screws 186. The second board 150 has a first side 188 and a second side 190. A decode connector 152 is connected to the second side 190 of the second board 150. The sensor 144 and the lighting devices 146 are electrically connected to the decode connector 152 via the connector 192.

A closing plate 156 having a shape which will conform to the shape of the housing 136 is secured to a second set of supports 154. This closing plate 156 will have an opening 194 so that the electrical connection from a decoder can be connected to the decoder connector 152. This electrical connection will allow a decoder such as a microcontroller 90 to read the sensor 144 and transmit the information to the facility computer 86, which may tie several gaming tables and video gaming machines together or which may tie several gaming facilities which may have table gaming and/or video gaming together.

The decoder connector 152 is a modular connector which allows an electrical connector to be plugged into the connector 152. The securing ring 160 secures the sensor device 118 to the table 10 so that the sensor 144 is aligned with a wagering areas 23a–g corresponding to a player position 18a–g. In the preferred embodiment, the sensing apparatus will be located below each one of the wagering areas 23a–g and located adjacent to the bottom of the table surface 16, such that the sensor device 118 is aligned with a wagering area 23a–g.

One advantage of this modular construction of the apparatus for sensing the presence of a gaming token is that the apparatus can be easily maintained. The apparatus is mounted to the gaming table 10 such that it is easily accessible, thereby, allowing for easy removal and replacement of the module.

Figure 9:
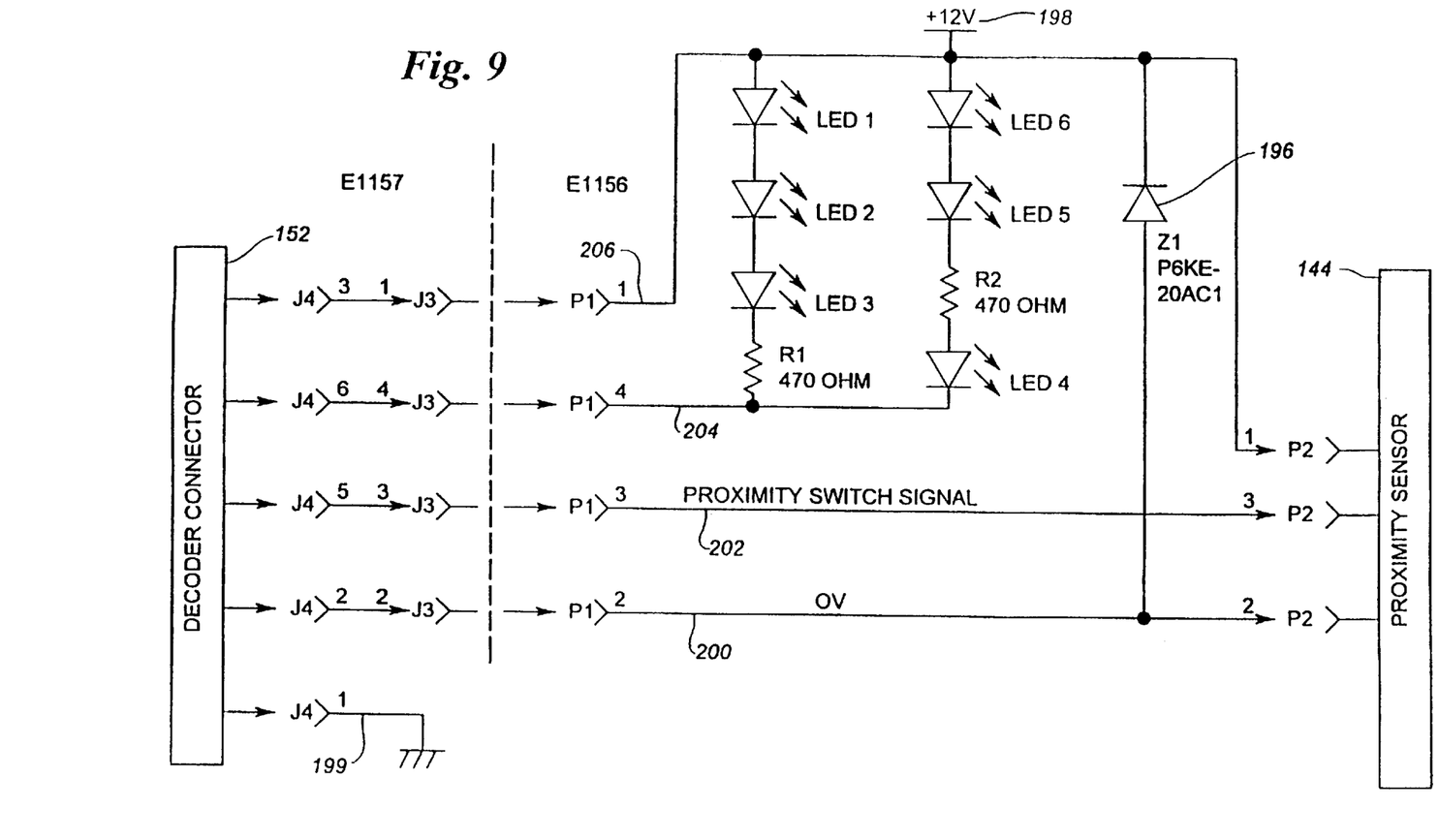
FIG. 9 is a circuit diagram of a proximity sensor device suitable for use in the present invention.

FIG. 9 shows the electrical connections between the sensor 144 and the decoder connector 152. There are five lines providing electrical connection from the decoder connector 152. One line 199 is connected to ground. Electrical lines 200, 202, 204, and 206 are connected to the proximity sensor 144 and the LEDs 146. As shown, the items on the first board 142 include the proximity sensor 144, the LEDs 146, and a Zener diode 196. The LEDs 146 and the proximity sensor 144 are connected to a twelve volt power supply 198. The Zener diode 196 allows electrical line 200 to have a constant voltage. When there is no object being sensed, the proximity switch signal line 202 is at twelve volts. Once there is an object being sensed by the sensor 144, the proximity switch signal 202 is driven to zero volts. This drop in voltage is transmitted via the decoder connector 152 to the microcontroller 90, where the microcontroller 90 determines that a gaming token has been sensed.

Electrical lines 204, 206 from the decoder connector 152 are connected to the two sets of three LEDs 146. This configuration will only prevent one set of three LEDs to not function if any one LED becomes defective. The microcontroller 90 may be able to detect when an LED is defective based on the voltage reading on line 206.

In operation, a player may choose to place a bet in area 23a–g, thereby entering the additional game of the multi-tiered wagering game. When the dealer locks in all the bets at the dealer control panel 70 using the "Begin Game" button 80, the microcontroller 90 reads the outputs at the various proximity sensor devices 118 at each table 10. If there is no gaming token at a betting area 23*a*–*g* corresponding to a particular player position 18*a*–*g*, then the proximity switching line 202 for the proximity sensor device 118 corresponding to the particular player position 18*a*–*g* is at twelve volts. When the microcontroller 90 reads a twelve volt signal on this line 202, the microcontroller 90 will determine that there is no gaming token at this betting area 23. However, if there is a gaming token placed in a betting area 23*a*–*g*, then the corresponding proximity switch signal 202 will be zero volts and the microcontroller 90 will determine the presence of a gaming token and register the bet. Upon detecting the presence of a gaming token, the microcontroller 90 will enable the LEDs 146 to be lit. Also, this betting information will be sent to the facility computer 86 and the central computer 98.

After the game is played, if a player entered the additional game of the multi-tiered game, the keypad 74 will instruct the dealer to pay the player if he has a configuration of cards which requires a payout. The apparatus of the present invention allows the gaming token to be kept in circulation by the casino. Also, this apparatus accurately and reliably allows the detection of the presence of a gaming token in a particular betting area.

The present invention may be embodied in other specific forms without departing from the essential attributes thereof. It is desired that the embodiments described above be considered in all respects as illustrative, not restrictive, reference being made to the appended claims to indicate the scope of the invention.

What is claimed is:

1. An apparatus for detecting the presence of a gaming token, comprising:
   (a) a gaming structure having a continuous top surface, a portion of the continuous top surface defining at least one predetermined location for receiving a non-electric gaming token placed thereon, the portion of the continuous top surface defining the at least one predetermined location being non-apertured;
   (b) a non-photoelectric proximity sensor for each of the at least one predetermined locations, each proximity sensor mounted directly below the non-apertured continuous top surface where the at least one predetermined location is defined such that each sensor is aligned with and in sensing proximity to one of the at least one predetermined location to sense the presence of a non-electric gaming token through the non-apertured continuous top surface; and (c) a decoder electrically connected to each proximity sensor for determining whether a non-electric gaming token is present on the at least one predetermined location.

2. The apparatus of claim 1, where the gaming structure is a gaming table with a gaming surface having at least one predetermined location for receiving a gaming token.

3. The apparatus of claim 1, further comprising a housing for receiving the proximity sensor.

4. The apparatus of claim 3, wherein the housing comprises a first board having a outer edge and at least one continuous inner edge, said inner edge forming a proximity sensor holder, the proximity sensor holder having dimensions such that the proximity sensor can be received by the proximity sensor holder.

5. The apparatus of claim 4, wherein the first board comprises a plurality of continuous inner edges forming a plurality of holders, wherein a plurality of lighting devices may be received by the holders.

6. The apparatus of claim 5, wherein the lighting devices are connected to the decoder.

7. The apparatus of claim 1, wherein the decoder is a microcontroller.

8. The apparatus of claim 1, wherein the decoder is a hard wired circuit.

9. The apparatus of claim 1, wherein the gaming structure is a video gaming machine having a predetermined location for receiving a gaming token.

10. The apparatus of claim 1 wherein at least one lighting device is present at each of the at least one predetermined location to visually indicate the presence or absence of a gaming token at a corresponding predetermined location.

11. The apparatus of claim 1 wherein a plurality of lighting devices at each of the at least one predetermined location, the plurality of lighting devices operably connected to the decoder for indicating the presence or absence of a gaming token at the corresponding predetermined location.

12. An apparatus for playing a wagering game with a single, typical fifty-two card poker deck or an electronically generated representation thereof, the cards having standard rank and value, said game involving generally well recognized and accepted five-card poker wager-resolving hand ranking outcomes, the apparatus comprising:
   (a) a gaming structure having a continuous top surface, a portion of the continuous top surface defining at least one player position, with each player position having a card area for receiving three cards, a plurality of wagering areas for placing a three-part wager to participate in the game and for placing a non-electronic gaming token representing a one-part wager to participate in an additional game the portion of the continuous flat top surface defining the placement of the one-part wager being non-apertured and non-recessed, wherein a portion of the three-part wager is withdrawable based on the three cards in the card area provided to a player at the at least one player position;
   (b) a non-photoelectric proximity sensor for each wagering area related to the additional game, each non-photoelectric proximity sensor mounted directly below the non-apertured continuous top surface where the wagering area for placing the one-part wager is located such that each sensor is aligned with and in sensing proximity to one wagering area related to the additional game to sense the presence of a non-electronic gaming token through the non-apertured continuous top surface; and
   (c) a decoder electrically connected to each non-photoelectric proximity sensor for determining whether a gaming token is present at a wagering area related to the additional game.

13. The apparatus of claim 12, further comprising a housing for receiving the proximity sensor, wherein the housing comprises a first board having a outer edge and at least one continuous inner edge, said inner edge forming a proximity sensor holder, the proximity sensor holder having dimensions such that the proximity sensor can be received by the proximity sensor holder.

14. The apparatus of claim 13, further comprising a plurality of lighting devices, wherein the first board comprises a plurality of continuous inner edges forming a plurality of holders, for receiving the plurality of lighting devices.

15. The apparatus of claim 14, wherein the lighting devices are connected to the decoder and are responsive to a signal from the decoder that indicates the presence or absence of a gaming token at a wagering area for participation in the additional game.

16. The apparatus of claim 15, wherein the decoder is a microcontroller.

17. The apparatus of claim 12, wherein the gaming structure is a gaming table.

18. The apparatus of claim 12, wherein the gaming structure is a video gaming machine.

19. An apparatus for playing an additional game in conjunction with a wagering game with a single, typical fifty-two card poker deck, the cards having standard rank and value, said game involving generally well recognized and accepted five-card poker wager-resolving hand ranking outcomes, the apparatus comprising:

(a) a gaming table having a continuous top surface, a portion of the continuous top surface defining a plurality player positions, with each player position having a plurality of wagering areas for placing a wager to participate in the game and for placing a non-electronic gaming token representing a wager to participate in the additional game, the portion of the continuous top surface defining the wagering area to participate in the additional game being non-apertured;

(b) a non-photoelectric proximity sensor for each wagering area related to the additional game, each non-photoelectric proximity sensor mounted directly below the non-apertured continuous top surface where the wager to participate in the additional game is located such that each sensor is aligned with and in sensing proximity to one wagering area related to the additional game to sense the presence of a non-electronic gaming token through the non-apertured continuous top surface; and (c) a microcontroller electrically connected to each non-photoelectric proximity sensor for encoding betting information related to the additional game from each non-photoelectric proximity sensor.

20. The apparatus of claim 19, further comprising a housing for receiving the proximity sensor, wherein the housing comprises a first board having a outer edge and at least one continuous inner edge, said inner edge forming a proximity sensor holder, the proximity sensor holder having dimensions such that the proximity sensor can be received by the proximity sensor holder.

21. The apparatus of claim 20, further comprising a plurality of lighting devices, wherein the first board comprises a plurality of continuous inner edges forming a plurality of holders, for receiving the plurality of lighting devices.

22. The apparatus of claim 20, wherein the lighting devices are connected to the microcontroller and are responsive to a signal from the decoder that indicates the presence or absence of a gaming token at a wagering area for participation in the additional game.

* * * * *